United States Patent [19]

Nakamura et al.

[11] Patent Number: 5,524,706
[45] Date of Patent: Jun. 11, 1996

[54] FREEZE-THAWING TANK ASSEMBLY

[75] Inventors: Satoshi Nakamura, Shizuoka; Tatsuo Kuroiwa, Osaka; Kingo Nakagawa, Shizuoka; Junji Oshima, Osaka, all of Japan

[73] Assignee: Takeda Chemical Industries, Ltd., Osaka, Japan

[21] Appl. No.: 891,170

[22] Filed: May 29, 1992

[30] Foreign Application Priority Data

May 30, 1991 [JP] Japan ................................. 3-127055
Oct. 8, 1991 [JP] Japan ................................. 3-260053

[51] Int. Cl.⁶ ............................ F25B 29/00; C02F 1/22; C02F 11/20
[52] U.S. Cl. ........................... 165/47; 165/61; 165/108; 165/157; 422/138; 62/352
[58] Field of Search .................... 62/352; 165/47, 165/61, 108, 109.1, 94, 909, 157; 422/135, 138

[56] References Cited

U.S. PATENT DOCUMENTS

| | | | |
|---|---|---|---|
| 1,461,364 | 7/1923 | Mabee et al. | 165/109.1 |
| 2,473,641 | 6/1949 | Feldstein | 165/108 |
| 2,699,322 | 1/1955 | Feldstein | 165/108 |
| 2,875,027 | 2/1959 | Dye . | |
| 3,206,287 | 9/1965 | Crawford | 165/109.1 |
| 4,105,066 | 8/1978 | Bühler | 165/94 |
| 4,951,738 | 8/1990 | Litzberg | 165/94 |

FOREIGN PATENT DOCUMENTS

| | | | |
|---|---|---|---|
| 3214357 | 10/1983 | Germany | 165/47 |
| 56-20080 | 5/1981 | Japan . | |
| 1-249200 | 10/1989 | Japan . | |
| 7706927 | 8/1978 | Sweden | 165/909 |
| 2060864 | 5/1981 | United Kingdom | 165/909 |

OTHER PUBLICATIONS

"Sludge Treatment by Freeze Thawing", Kogyo Yosui (Industrial Water), pp. 23–28, Sep. 1975 (untranslated).

*Primary Examiner*—John K. Ford
*Attorney, Agent, or Firm*—Wenderoth, Lind & Ponack

[57] ABSTRACT

A freeze-thawing tank assembly includes an upright vessel having a hollow defined therein for accommodating therein a quantity of fluid medium to be treated. The vessel is closed at an upper end by a lid and at a lower end by a normally closed discharge valve. A plurality of double-walled structures are accommodated within the hollow of the vessel in equally spaced and parallel relation with each other. Each of the double-walled structures has a fluid passage defined therein for the flow of a heat-exchanging fluid medium and also has a fluid inlet and outlet communicated with the fluid passage. The fluid medium to be treated may be alternately frozen and thawed by passing the heat-exchanging medium through the fluid passages in the double-walled structures.

7 Claims, 5 Drawing Sheets

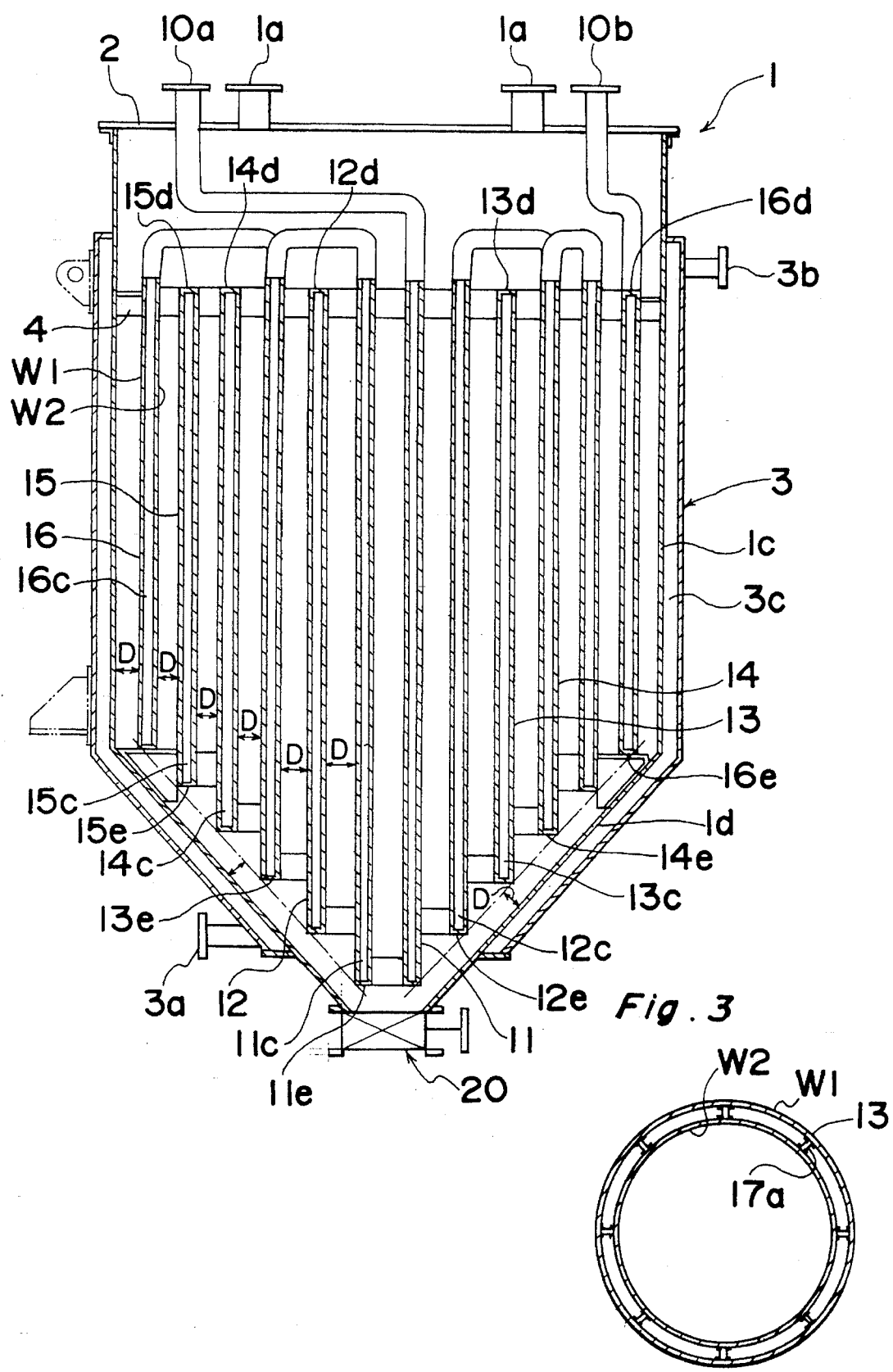

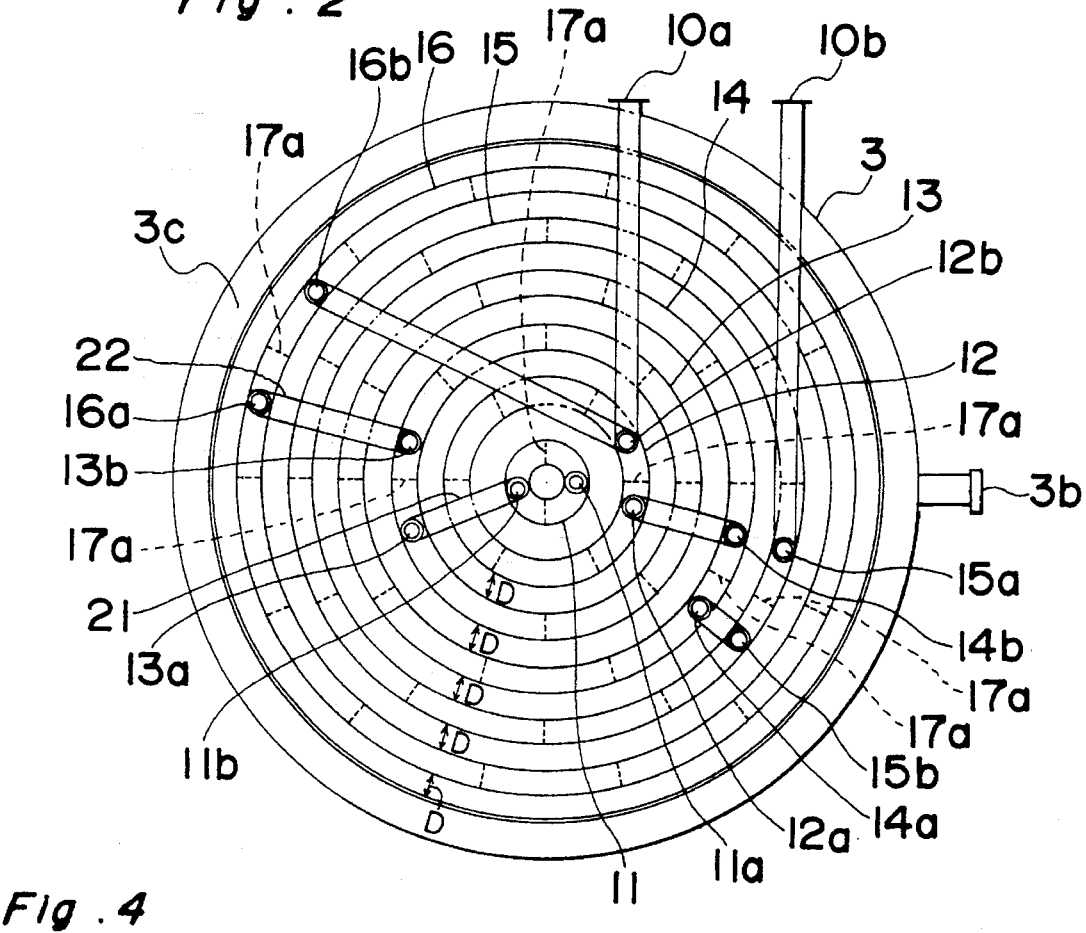
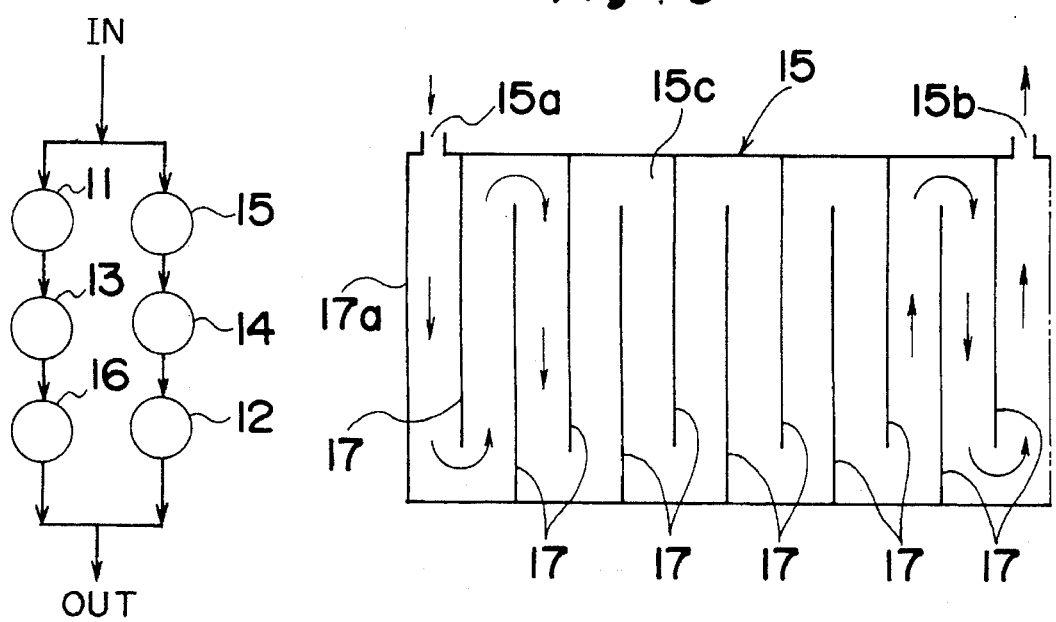

FREEZE-THAWING TANK ASSEMBLY

BACKGROUND OF THE INVENTION

1. Field of the Invention

The present invention relates to a freeze-thawing tank for use in freeze-thawing an aqueous dispersion containing colloidally stabilized solid particles such as, for example, polymer lateces or water-insoluble polysaccharides, or sludge.

2. Description of the Prior Art

For accomplishing a liquid-solid separation of an aqueous dispersion containing colloidally stabilized particles into a water component and a solid component, there is known a chemical flocculating process in which the solid particles are flocculated in the presence of a salt such as common salt or calcium chloride, an acid such as, for example, hydrochloric acid or acetic acid, a hydrophilic solvent such as, for example, alcohol or acetone, or a water-soluble polymer such as, for example, polyacrylamide or polyethylene-imine, and a physical flocculating process including a spray drying method and a freeze-thawing method.

The freeze-thawing method is known as a liquid-solid separation technique in which a fluid medium to be treated is frozen and then thawed so that the colloidally stabilized state of solid particles contained in the fluid medium can be lost to facilitate flocculation of the solid particles. This freeze-thawing method is extremely effective for the liquid-solid separation of functionally modified polymer lateces which, when the chemical flocculating method or the spray drying method is employed, would result in a chemical reaction.

In the practice of the freeze-thawing method, a freeze-thawing tank is generally employed, an example of which is shown in FIGS. 9(a) and 9(b). The prior art freeze-thawing tank comprises a generally funnel-shaped tank body 61 having a plurality of, for example, two, spirally coiled tubes 71 and 72 accommodated coaxially within the tank body 61. This prior art freeze-thawing tank is so designed and so structured that, when in use, the fluid medium to be treated is filled into the tank body 61, cooled brine is allowed to flow through the coiled tubes 71 and 72 to freeze the fluid medium and, after the fluid medium has completely been frozen, heated brine is then allowed to flow through the coiled tubes 71 and 72 to thaw the fluid medium before it is discharged to the outside of the tank body 61.

It has however, been found that the prior art freeze-thawing tank of the construction shown in FIG. 9 has a problem in that, since a space A between each neighboring convolution 71a of any one of the coiled tubes 71 to 72, as shown in FIG. 10(a), constitutes a dead space, solid particles contained in the fluid medium being treated tend to build up in the spaces A and, therefore, the fluid medium, after having been treated cannot be completely discharged out of the freeze-thawing tank. The prior art freeze-thawing tank also has a problem in that, while each of the coiled tubes 71 and 72 are formed by spirally winding a straight tube, not only is the spiral winding of the straight tube very difficult to achieve, but a mounting of the whole number of the coiled tubes within the tank body is also difficult to achieve. In any event, the prior art freeze-thawing tank is complicated in structure and requires a complicated and time-consuming workability in cleaning and maintenance.

Moreover, according to the structure shown in FIG. 9, the distance between neighboring cooling faces of any one of the coiled tubes is not constant and, consequently, the width of a portion of the fluid medium to be treated which is present between the neighboring cooling faces of any one of the coiled tubes varies depending on the position. Accordingly, as shown in FIG. 10(b), at the time portions of the fluid medium present within regions F spaced a predetermined distance from a longitudinal axis of each of the convolutions 71a and 72a of any one of the coiled tubes have been completely frozen, portions of the fluid medium present in regions f have not yet been frozen completely. Accordingly, in order for the entire quantity of the fluid medium within the tank to be completely frozen, those portions of the fluid medium present in the regions F has to be supercooled so that the portions of the fluid medium present in the regions f can be cooled to freeze in contact with the supercooled portions of the fluid medium, requiring a prolonged length of time to complete the complete freezing of the fluid medium as a whole. The reverse of the foregoing description may equally apply to the case where the frozen fluid medium is to be thawed.

In addition, a freezing condition or state varies between the regions F and the regions f and, therefore, the solid particles, after having been thawed, may exhibit a varying particle size. Accordingly, where the solid particles extracted from the fluid medium by the utilization of the freeze-thawing technique are desired to be employed for a secondary purpose, the varying particle size may pose a problem.

SUMMARY OF THE INVENTION

The present invention has been devised with a view to substantially eliminating all of the above discussed problems inherent in the prior art freeze-thawing tank and is intended to provide an improved freeze-thawing tank of a construction wherein the fluid medium, after having been frozen and thawed, can be satisfactorily discharged, and wherein freezing and thawing conditions to which the fluid medium to be treated is subjected can be developed uniformly within the interior of the tank.

To describe the structure necessary to accomplish the foregoing object, with reference to FIGS. 1 and 2 corresponding to an embodiment of the present invention, the present invention can be characterized in that, within the interior of a vessel 1 provided at a lower end with a discharge port 1b, a plurality of double-walled structures (for example, cylindrical coil barrels each having a hollow defined therein) 11, 12, 13, 14, 15 and 16 are accommodated in equally spaced and parallel relation with each other. Each of the double-walled structures 11 to 16 has a fluid passage 11c, 12c, 13c, 14c, 15c and 16c defined therein for the flow of a heat-exchanging fluid medium and also has a fluid inlet 11a, 12a, 13a, 14a, 15a and 16a and a fluid outlet 11b, 12b, 13b, 14b, 15b and 16b both communicated with the fluid passage 11c to 16c. The fluid medium to be treated may be alternately frozen and thawed by passing a heat-exchanging medium through the fluid passages 11c to 16c in the double-walled structures 11 to 16.

By constructing the plural double-walled structures, to be accommodated within the vessel 1, in the form of the cylindrical coil barrels 11 to 16 arranged In concentrical relationship with a longitudinal axis of the vessel 1, the double-walled structures, that is, the cylindrical coil barrels 11 to 16, can be spaced from each other an equal distance uniformly in a direction parallel to the longitudinal axis of the vessel 1. In other words, the width of the fluid medium to be treated that is present between cooling faces of the respective cylindrical coil barrels 11 to 16 can be rendered to be constant at any position in the direction parallel to the longitudinal axis of the vessel 1. In this way, cooling conditions (states) to which the fluid medium to be treated is subjected within the vessel 1 can be rendered to be uniform, thereby avoiding the necessity of freezing by means of a localized supercooling.

Also, within the interior of the vessel 1, only the double-walled structures 11 to 16 extending at a uniform thickness in the direction parallel to the longitudinal axis of the vessel 1 and cramp members exist, and therefore the internal structure thereof is not only simple, but will not provide any dead space at the time of discharge of the fluid medium.

BRIEF DESCRIPTION OF THE DRAWINGS

The above and other objects and features of the present invention will become readily understood from the following description of preferred embodiments, taken with reference to the accompanying drawings, in which like parts are designated by like reference numerals and in which:

FIG. 1 is a longitudinal sectional view of a freeze-thawing tank embodying the present invention;

FIG. 2 is a top plan view of the freeze-thawing tank shown in FIG. 1;

FIG. 3 is a cross-sectional view of a cylindrical coil barrel employed in the freeze-thawing tank, with a lid removed;

FIG. 4 is a schematic diagram showing the connection of cylindrical coil barrels;

FIG. 5 is a schematic diagram showing one of cylindrical coil barrels in a developed pattern;

DETAILED DESCRIPTION OF THE EMBODIMENTS

Figure 6:
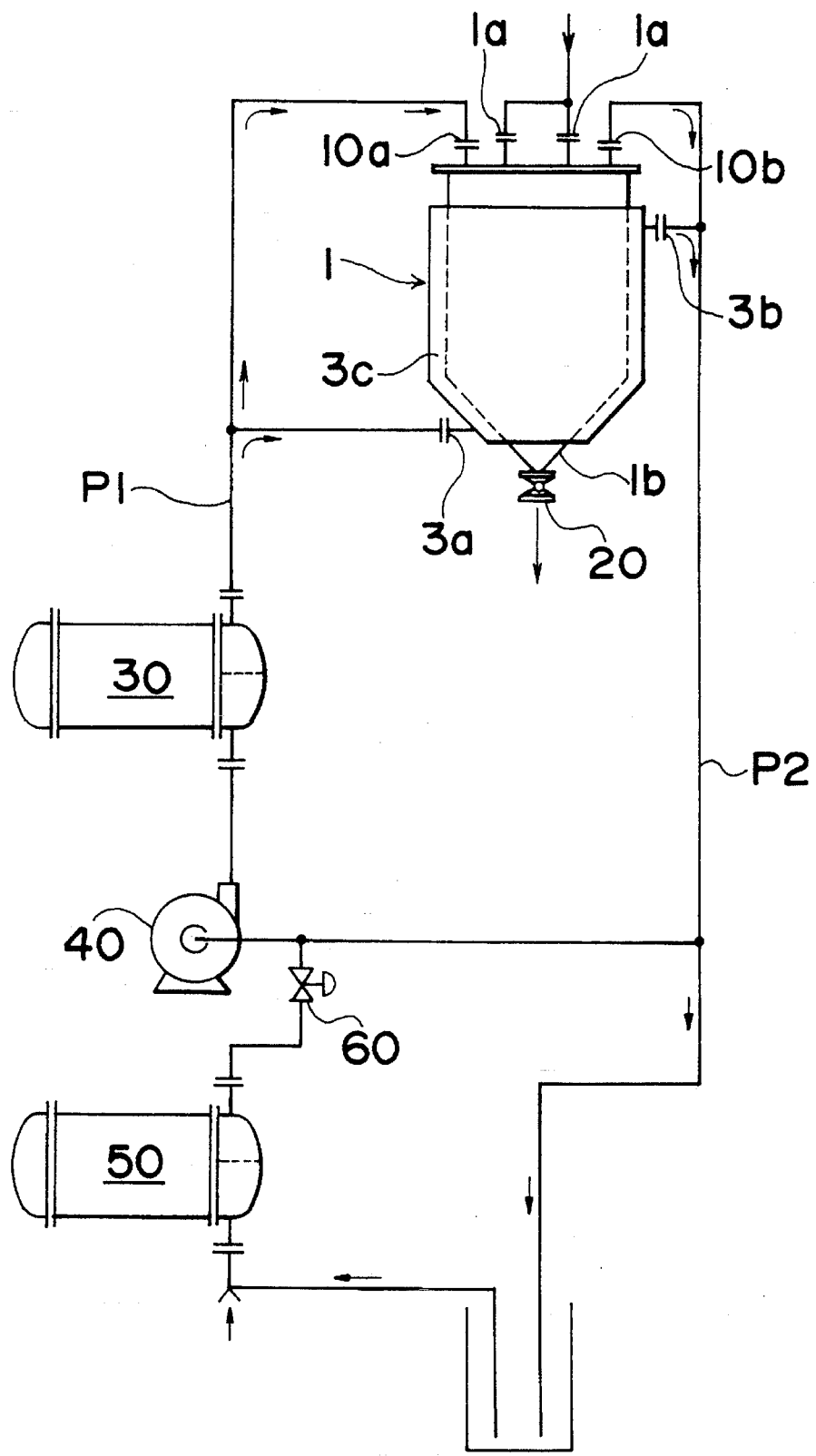
FIG. 6 is a diagram showing a piping system in which the freeze-thawing tank is employed.

Referring first to FIGS. 1 and 3, a freeze-thawing tank embodying the present invention generally identified by 1 comprises a generally cylindrical body $1c$ having a lower end continued to a downwardly tapering funnel $1d$ of a generally inverted frusto-conical shape. The downwardly tapering funnel $1d$ has its bottom open to define a discharge port $1b$, which is connected with a valve 20 for controlling the discharge of fluid medium to be treated. A lid 2 is mounted on an upper end of the cylindrical body $1c$ to close the opening thereat and is formed with two flanged fluid supply ports $1a$ that are adapted to be fluid-connected with a source of fluid medium to be treated.

The freeze-thawing tank 1 also comprises a jacket 3 surrounding exteriorly the cylindrical body $1c$ and the downwardly tapering funnel $1d$ to define a brine chamber $3c$ between the jacket 8 and both of the cylindrical body $1c$ and the funnel $1d$ for the flow of brine therethrough. A brine inlet joint tube $3a$ and a brine outlet joint tube $3b$ are secured to lower and upper portions of the jacket 3, respectively, in communication with the brine chamber $3c$.

The freeze-thawing tank 1 accommodates therein a plurality of, for example, six, cylindrical coil barrels 11, 12, 18, 14, 15 and 16 disposed in concentrical relationship with each other and also with the longitudinal axis of the tank 1. These cylindrical coil barrels 11 to 16 are of substantially identical structure, as will be described later, but are of progressively varying diameters and of progressively varying lengths to suit to the longitudinal sectional contour of the freeze-thawing tank 1 as shown in FIG. 1. These cylindrical coil barrels 11 to 16 are coaxially supported in position within the freeze-thawing tank 1 in any known manner, for example, by means of a plurality of radial spider arms or clamp members such as identified by 4 and 5 in FIG. 1, and are spaced an equal distance D from each other in a direction radially thereof and also from the inner surface of the tank.

Each of the coil barrels 11 to 16 comprises inner and outer cylindrical walls W2 and W1 of equal length spaced a predetermined distance from each other, an annular top wall $11d$, $12d$, $18d$, $14d$, $15d$ or $16d$ of a width equal to the predetermined distance between the inner and outer cylindrical walls W2 and W1 and having inner and outer peripheral edges welded to respective top ends of the inner and outer cylindrical walls W2 and W1, and an annular bottom walls $11e$, $12e$, $13e$, $14e$, $15e$ or $16e$ of a width equal to the predetermined distance between the inner and outer cylindrical walls W2 and W1 and welded to respective bottom ends of the inner and outer walls W2 and W1. With the inner and outer walls W2 and W1 and the top and bottom annular walls $11d$, $12d$, $13d$, $14d$, $15d$ or $16d$ and $11e$, $12e$, $13e$, $14e$, $15e$ or $16e$ assembled together to form each of the coil barrels 11 to 16 in the manner described above, it will readily be seen that each coil barrel 11, 12, 13, 14, 15 or 16 has a cylindrical space defined therein and delimited by the inner and outer walls and the top and bottom annular walls.

Each coil barrel 11 to 16 also comprises a plurality of partition walls generally identified by 17 as shown in FIG. 3. These partition walls 17 are accommodated within the respective cylindrical space that is delimited by the inner and outer walls and the top and bottom annular walls, and spaced an equal distance from each other in a direction circumferentially of the corresponding coil barrel 11 to 16 so as to define a generally tortuous brine passage $11c$, $12c$, $13c$, $14c$, $15c$ or $16c$ as will be described later and as shown in FIG. 5.

The cylindrical space in each coil barrel 11 to 16 is communicated to the outside through brine inlet and outlet $11a$ and $11b$, $12a$ and $12b$, $13a$ and $13b$, $14a$ and $14b$, $15a$ and $15b$ or $16a$ and $16b$ defined in the corresponding annular top wall $11d$, $12d$, $13d$, $14d$, $15d$ or $16d$ at respective positions adjacent to each other.

FIG. 5 illustrates in schematic representation and in the form as developed in a plane the structure of one of the coil barrels, for example, the coil barrel 15. As shown in FIG. 3, one of the partition walls, that is, the partition wall $17a$, has a length equal to the length of any one of the inner and outer cylindrical walls W2 and W1 and extends over the entire length thereof with all side edges welded respectively to the inner and outer walls W2 and W1 and the top and bottom annular walls $15d$ and $15e$. It is to be noted that an upper end of the partition wall $17a$ welded to the annular top wall $15d$ is positioned between the brine inlet and outlet $15a$ and $15b$ defined in the annular top wall $15d$. The remaining partition walls 17 are of a length smaller than the length of any one of the inner and outer walls W2 and W1 and are disposed within the respective cylindrical space so as to define the corresponding tortuous brine passage 15c extending in a zig-zag fashion from the brine inlet 15a towards the brine outlet 15b so that a fluid medium entering the brine inlet 15a can flow alternately downwardly and upwardly through the tortuous brine passage 15c towards the brine outlet 15b.

Referring still to FIG. 3, each of the partition walls 17 has a length so selected that the respective partition wall 17 having its upper or lower end welded to the annular top or bottom wall 15d or 15e, respectively, can terminate at a position spaced inwardly from the annular bottom or top wall 15e or 15d a distance equal to or substantially equal to the pitch between each neighboring partition wall 17. This design is effective to accomplish a substantially equal loss of pressure of the brine flowing through the entire tortuous brine passage 15c from the brine inlet 15a towards the brine outlet 15b.

It is to be noted for, except that the coil barrels 11 to 16 having different diameters and different lengths as hereinbefore mentioned, any one of the coil barrels 11 to 14 and 16 are of a construction substantially similar to that of the coil barrel 15 shown in and described with reference to FIG. 5. Thus, the tortuous brine passage 11c extends in a zig-zag fashion from the brine inlet 11a towards the brine outlet 11b; the tortuous brine passage 12c extends in a zig-zag fashion from the brine inlet 12a towards the brine outlet 12b; the tortuous brine passage 13c extends in a zig-zag fashion from the brine inlet 13a towards the brine outlet 13b; the tortuous brine passage 14c extends in a zig-zag fashion from the brine inlet 14a towards the brine outlet 14b; and the tortuous brine passage 16c extends in a zig-zag fashion from the brine inlet 16a towards the brine outlet 16b.

As best shown in FIG. 2, the brine outlet 11b in the coil barrel 11 is communicated with the brine inlet 13a in the coil barrel 13 through a connecting pipe 21; the brine outlet 13b in the coil barrel 13 is communicated with the brine inlet 16a in the coil barrel 16 through a connecting pipe 22; the brine outlet 15b in the coil barrel 15 is communicated with the brine inlet 14a in the coil barrel 14 through a connecting pipe 23; and the brine outlet 14b in the coil barrel 14 is communicated with the brine inlet 12a in the coil barrel 12 through a connecting pipe 24. The respective brine inlets 11a and 15a in the coil barrels 11 and 15 are communicated with a brine supply pipe joint 10a fixedly mounted on the lid 2, and the respective brine outlets 16b and 12b in the coil barrels 16 and 12 are communicated with a brine return pipe joint 10b similarly fixedly mounted on the lid 2.

Thus, it will readily be seen that, while each of the coil barrels 11 to 16 has the tortuous brine passage 11c to 16c defined therein, the coil barrels 11 to 16 within the freeze-thawing tank 1 provides two brine flow paths extending from the brine supply pipe joint 10a to the brine return pipe joint 10b. One of these flow paths includes the tortuous brine passages 11c, 13c and 16c in the respective coil barrels 11, 13 and 16 that are connected in series with each other, as shown in FIG. 4, while the other of the flow paths includes the tortuous brine passages 15c, 14c and 12c in the respective coil barrels 15, 14 and 12 that are similarly connected in series with each other.

The freeze-thawing tank 1 of the above described construction in accordance with the present invention is in a fluid treatment circuit shown in FIG. 6.

Referring to FIG. 6, the brine supply pipe joint 10a and the brine inlet joint tube 3a leading to the jacket 3 are fluid-connected with a discharge port of a pump assembly 40 through a heat exchanger 30 through supply piping P1, whereas the brine return pipe joint 10b and the brine outlet joint tube 3b extending from the jacket 3 are fluid-connected with a suction port of the pump assembly 40 through return piping P2. The discharge port 1b of the tank 1 is provided with a normally closed discharge valve 20.

The suction port of the pump assembly 40 is also fluid-connected with a brine discharge port of an evaporator 50, forming a part of a refrigerator, through an electromagnetic valve 60, so that the temperature of the brine flowing through the fluid treatment circuit including the pump assembly 40 and the freeze-thawing tank 1 can be kept at a predetermined low temperature, for example, $-5°$ C. However, when a heated gas is supplied into a shell forming a part of the heat exchanger 30, the temperature of the brine flowing through the fluid treatment circuit can be kept at a predetermined high temperature, for example, $25°$ C.

When the fluid medium to be treated is to be frozen, the fluid medium is supplied into the freeze-thawing tank 1 while the discharge valve 20 is in position to close the discharge port 1b. The amount of the fluid medium supplied into the freeze-thawing tank 1 should be such that the top surface level of the fluid medium within the freeze-thawing tank 1 can lie at a level slightly lower than the level at which the annular top walls 11d to 16d of the coil barrels 11 to 16 lie. While the fluid medium is accommodated within the freeze-thawing tank 1, a cooled brine is supplied into the brine chamber 3c in the jacket 3 through the brine inlet Joint tube 3a and also into the coil barrels 11 to 16 through the brine inlet Joint pipe 10a so that the peripheral wall defining the tank 1 and also the inner and outer cylindrical walls W2 and W1 of each of the coil barrels 11 to 16 can be cooled to initiate freezing of the fluid medium accommodated within the freeze-thawing tank 1.

It is to be noted that, during the freezing process, the fluid medium within the freeze-thawing tank 1 undergoes convection in a vertical direction generally parallel to the longitudinal axis of the tank 1 by the effect of a temperature differential and, therefore, the freezing of the fluid medium progress from a lower region of the tank 1 towards an upper region thereof. Accordingly, stresses built up by thermal expansion of the water content of the fluid medium as the latter is frozen are gradually released upwardly to thereby to minimize any possible damage to both the tank 1 and the coil barrels 11 to 16.

After the fluid medium within the freeze-thawing tank 1 has been completely frozen, a heated brine is supplied into the freeze-thawing tank 1 while the discharge valve 20 is still kept in position to close the discharge port 1b, thereby to effecting a thawing process to the frozen fluid medium. The discharge valve 20 is brought in position to open the discharge port 1b when the fluid medium within the tank 1 has been completely thawed, to discharge the fluid medium out of the freeze-thawing tank 1.

The environment in which the freeze-thawing tank 1 of the present invention is employed and the manner in which the fluid treating circuit is operated are well known to those skilled in the art and are not, therefore; discussed herein for the sake of brevity. Although the use of the brine has been referred to as a heat-exchanger medium, the heat-exchanger medium may be employed in the form of liquid nitrogen or any other medium known to those skilled in the art.

It is to be noted that, although the partition walls 17 employed in each of the coil barrel 11 to 16 to define the corresponding tortuous brine passages 11c to 16c have been shown as a generally rectangular wall member, the tortuous brine passage 11c to 16c can be defined by the utilization of a single partition wall member if the latter is spirally disposed within the cylindrical space defined between the inner and outer walls W2 and W1 in each coil barrel. It is also to be noted that, according to a broad aspect of the present invention, the use of the partition walls 17 is not always essential, however, the use thereof is preferred in order to avoid any possible short-circuiting between the brine inlet and outlet 11a and 11b, 12a and 12b, 13a and 13b, 14a and 14b, 15a and 15b or 16a and 16b and also to minimize a difference in temperature between a lower region of the respective coil barrel 11 to 16 and an upper region thereof.

In describing the foregoing preferred embodiment of the present invention, the coil barrels 11 to 16 within the freeze-thawing tank 1 have been shown and described as fluid-connected so as to provide the two brine flow paths both extending from the brine supply pipe joint 10a to the brine return pipe joint 10b. However, according to a broad aspect of the present invention, the number of the coil barrels 11 to 16 may not always be limited to six, such as shown and described, and may be chosen depending on the volume of the freeze-thawing tank 1 and/or the kind of the fluid medium to be treated. Moreover, the toll barrels 11 to 16 may be fluid-connected so as to provide at least one flow path or three or more flow paths.

Yet, the jacket 3 has been shown and described as mounted around the freeze-thawing tank 1 to define the brine chamber 3c. The use of the jacket 3 is employed for the purpose that a component of the fluid medium situated between the wall defining the tank 1 and the outermost one of the coil barrels, that is, the coil barrel 16 can receive a cooling condition equal to that applied to any other component of the fluid medium situated between each neighboring coil barrels. However, if the spacing between the wall defining the tank 1 and the outermost coil barrel 16 is dispensed with or is narrowed to such an extent that that component of the fluid medium situated between the wall defining the tank 1 and the outermost coil barrel 16 can receive a cooling condition equal to that applied to any other component of the fluid medium situated between each neighboring coil barrels, the jacket 3 may not be employed.

According to the foregoing embodiment of the present invention, the freeze-thawing tank 1 has been shown and described as comprising the cylindrical body 1c having a lower end continued to the downwardly tapering funnel 1d and accommodating therein the generally cylindrical coil barrels 11 to 16. However, the freeze-thawing tank may be of a generally square sectional shape as shown by 101 in FIG. 7, accommodating therein a plurality of, for example, three, generally square-sectioned coil barrels 111, 112 and 113 each having an interior structure similar to that of any one of the cylindrical coil barrels 11 to 16.

Figure 7:
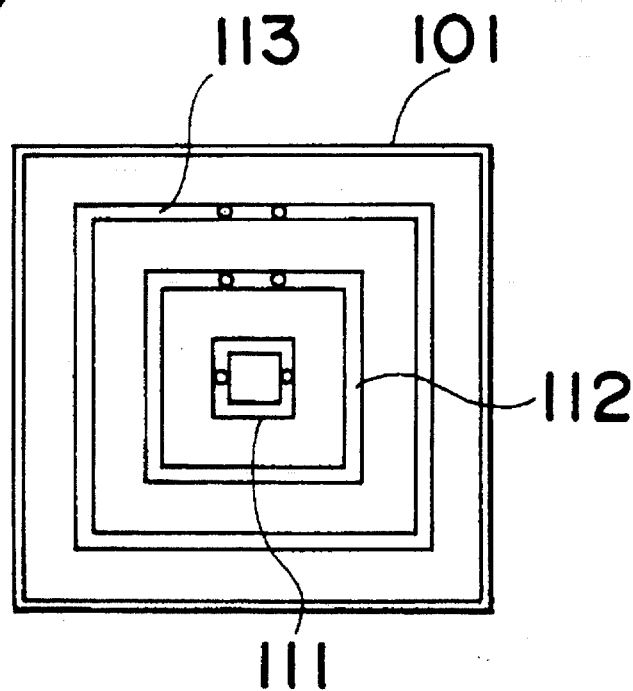
FIGS. 7 and 8 are schematic top plan views of the freeze-thawing tank according to second and third embodiments of the present invention, respectively.
Figure 8:
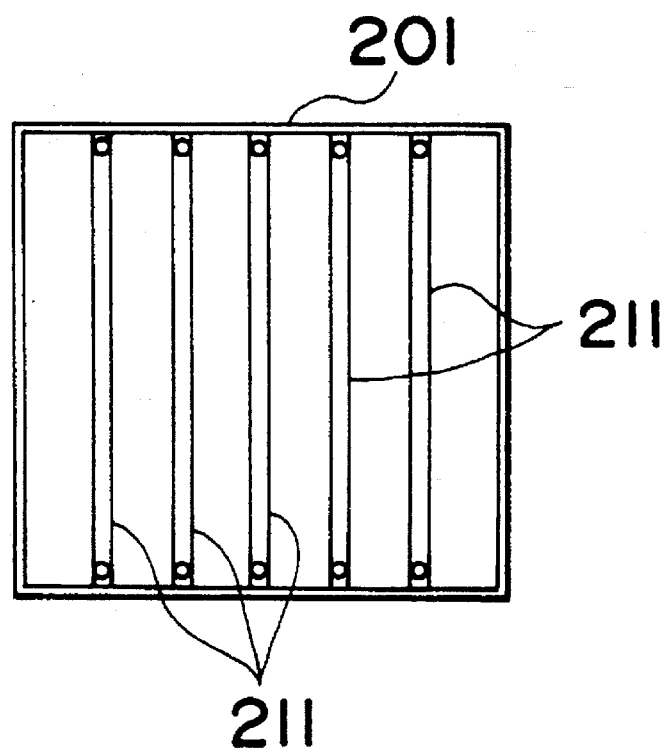
Figure 9A:
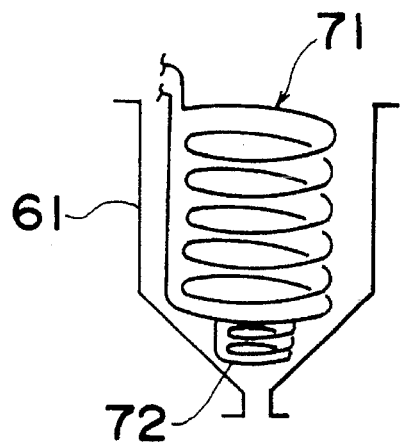
FIGS. 9(a) and 9(b) are schematic longitudinal sectional and top plan views of a prior art freeze-thawing tank.
Figure 9B:
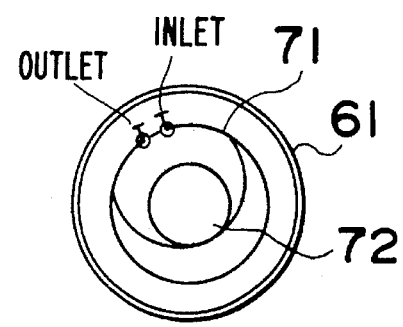
Figure 10A:
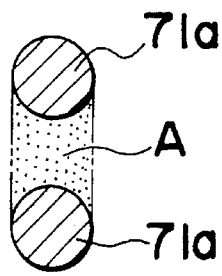
FIGS. 10(a) and 10(b) are schematic fragmentary sectional view of coiled tubes employed in the prior art freeze-thawing tank shown for the purpose of discussion of the problems inherent in the prior art freeze-thawing tank.
Figure 10B:
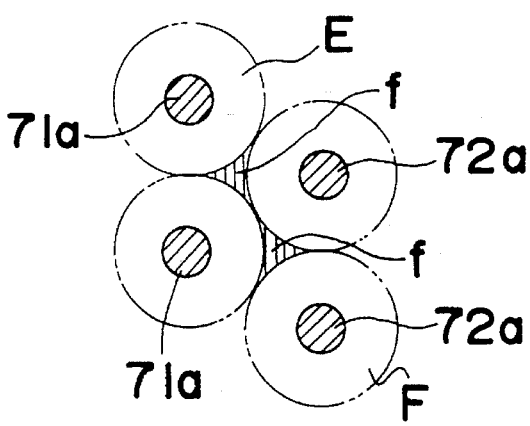

Alternatively, as shown in FIG. 8, while the freeze-thawing tank 201 is of a generally square sectional shape as shown in FIG. 7, a plurality of identical coil panels 211 may be disposed within the tank 201 in equally spaced and parallel relationship with each other. In this example, each of the coil panels 211 may be of a structure similar to a version of any one of the cylindrical coil barrels 11 to 16 which is developed in a plane. It is pointed out that the coil panels 211 shown in FIG. 8 may be equally employed in the freeze-thawing tank 1 of FIG. 1 in place of the cylindrical coil barrels 11 to 16.

Hereinafter, the freeze-thawing tank assembly of the present invention will be demonstrated as used in a process of liquid-solid separation of a core-shell polymer latex of the following composition.

| Copolymer of the following composition: | |
|---|---|
| Core layer: | |
| Butyl acrylate | 82.66 parts |
| Ethylene gylcol dimethacrylate | 0.17 part |
| Allylmetacrylate | 0.17 part |
| Glycidyl methacrylate | 2.00 parts |
| Shell layer: | |
| Poly(methyl methacrylate) | 15.00 parts |

4.5 tons of the core-shell polymer latex containing 42% of solid particles of the above described polymers was supplied from a reactor to a freeze-thawing tank of 5 $m^3$ in volume. Brine cooled to $-5°$ C. was subsequently recirculated through the jacket and the coil barrels for 48 hours to freeze the latex completely within the freeze-thawing tank. Thereafter, vapor was supplied into the heat-exchanger for the brine to heat the brine to 40° C. The brine heated to 40° C. was recirculated through the jacket and the coil barrels for 20 hours to thaw the frozen latex, permitting the latex to transform into a slurry.

The slurry was then discharged to a centrifugal machine to dehydrate the slurry to dry, thereby producing a core-shell type impact modifier for synthetic resin.

The resultant impact modifier was in the form of uniform granules exhibiting zero in 100 mesh pass and 12 mesh on and was found to have produced at a favorable workability. It is pointed out that, where the solid component was separated from the polymer latex of the foregoing composition by the use of any one of the chemical flocculating method and the spray drying method, an epoxy ring of the glycidyl methacrylate was found to have been partially opened and, therefore, no desired impact modification was attained.

As hereinbefore fully described, the freeze-thawing tank accommodates therein, for example, the cylindrical coil barrels of varying diameters arranged in the concentrical relationship with each other while the cylindrical coil barrels are equally spaced from each other in a direction radially of the tank. While the fluid medium to be treated is filled in the tank, the freezing and thawing of the fluid medium are alternately carried out by recirculating the cooled and heated brines through the coil barrels defining at least one flow path for the brine. Accordingly, substantially the entire amount of the fluid medium within the tank can be cooled and heated under equal condition with no localized supercooling taking place. Therefore, as compared with the prior art, the length of time required to completely freeze and thaw the fluid medium to be treated can be reduced, contributing to an improvement in efficiency.

Also, since substantially the entire amount of the fluid medium to be treated within the tank can be cooled under equal condition and in the case where the solid particles extracted from the fluid medium by the utilization of the freeze-thawing process are utilized for any purpose other than being disposed of, any possible variation in particle size of the resultant solid particles can be minimized.

In addition, since only the walls of uniform thickness extending in a direction parallel to the longitudinal axis of the tank and the clamp members for the support thereof exist within the tank, the structure of the tank assembly as a whole is simple enough to avoid any possible formation of dead spaces which would be problematic when the fluid medium having been treated is to be discharged. Therefore, the tank assembly of the present invention can be assembled easily and can exhibit superior performance in discharging the fluid medium having been treated and also in maintenance servicing.

Figure 11:
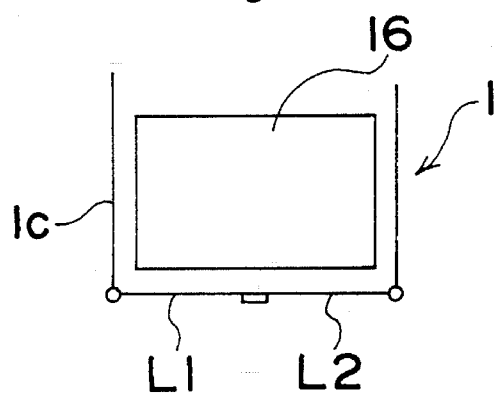
FIGS. 11 and 12 are schematic diagrams showing a modified form of the freeze-thawing tank in different operative positions, respectively.
Figure 12:
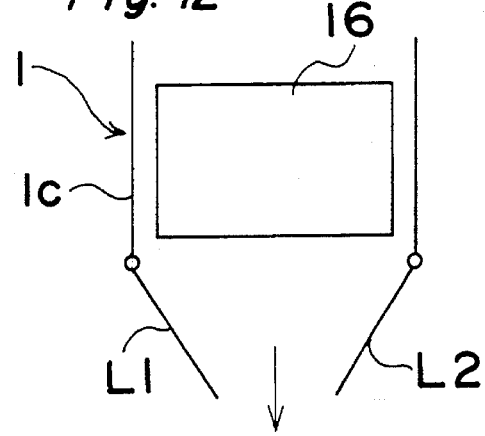

Although the present invention has been described in connection with the preferred embodiments thereof with reference to the accompanying drawings, it is to be noted that various changes and modifications are apparent to those skilled in the art. By way of example, in the foregoing description, the freeze-thawing tank 1 has been described and shown as including the cylindrical body 1c and the downwardly tapering funnel 1d with the valve 20 secured to the bottom opening of the funnel 1d. However, as shown in FIGS. 11 and 12, the downwardly tapering funnel 1d may be dispensed with and, instead thereof, the bottom opening of the cylindrical body 1c may have a double lid assembly including a pair of generally semicircular lids L1 and L2 hinged to a bottom ends of the cylindrical body 1c at respective locations spaced 180° from each other in a circumferential direction, for selectively opening and closing the bottom opening of the cylindrical body 1c.

Accordingly, such changes and modifications are to be understood as included within the scope of the present invention as defined by the appended claims, unless they depart therefrom.

What is claimed is:

1. A freeze-thawing tank assembly for solid-liquid separation of polymer latex to provide polymer particles of a uniform particle size by sequentially freezing and thawing the polymer latex, said assembly comprising:

an upright vessel having a hollow defined therein for accommodating a quantity of polymer latex to be treated, said upright vessel including a generally cylindrical wall having a longitudinal axis and also having top and bottom ends opposite to each other, and a generally conical bottom wall connected at an upper end thereof with said bottom end of said cylindrical wall and having a shape that tapers downwardly toward a lower end thereof so as to converge at a point on said longitudinal axis of said cylindrical wall, said lower end of said conical bottom wall being closed by an openable discharge valve;

a heat-exchanging fluid medium inlet;

a heat-exchanging fluid medium outlet;

a plurality of coil barrels disposed concentrically within said hollow of said vessel about said longitudinal axis and radially spaced an equal distance from each other so as to allow heat-exchange conditions to be uniformly distributed within said upright vessel;

wherein one of said coil barrels is positioned closest to said cylindrical wall of said vessel, the one of said coil barrels being spaced radially inwardly from said cylindrical wall a radial distance substantially equal to said equal distance which each of said plurality of coil barrels is further spaced from each other, said plurality of coil barrels have lower ends spaced inwardly an equal axial distance from said conical bottom wall of said vessel in a direction along said longitudinal axis, and each of said plurality of coil barrels is further spaced from said conical bottom, in a direction perpendicular to said conical bottom, a distance equal to said equal distance which each of said plurality of coil barrels are spaced from each other;

wherein each of said plurality of coil barrels comprises a double-walled cylindrical structure comprising inner and outer walls spaced a distance from each other in the radial direction of said vessel so as to define an annular space therebetween, and a plurality of partition walls disposed within said annular space that are spaced a distance from each other in the circumferential direction of said vessel, extend parallel to each other and also to said longitudinal axis and define a fluid passage in said annular space for the flow of a heat-exchanging fluid medium therethrough;

wherein each of said inner and outer walls of said double-walled cylindrical structure has an outer surface exposed to said hollow of said upright vessel for contact with the polymer latex and an inner surface defining said fluid passage for contact with the heat-exchanging fluid medium flowing therethrough;

wherein each of said coil barrels has a length corresponding to the length of said upright vessel in the direction of said longitudinal axis at the radial position of the respective said coil barrel; and wherein each said fluid passage of said plurality of coil barrels has a fluid inlet and a fluid outlet communicating at least indirectly with said heat-exchanging fluid medium inlet and said heat-exchanging fluid medium outlet, respectively.

2. The assembly of claim 1, wherein a heating medium is in said plurality of double-walled structures as a heat-exchanging fluid medium.

3. The assembly of claim 1, wherein brine is in said plurality of double-walled structures as a heat-exchanging fluid medium.

4. The assembly of claim 1, and further comprising a jacket secured to the exterior of and surrounding said upright vessel, said jacket defining a brine chamber between said jacket and said upright vessel.

5. The tank assembly of claim 1, wherein said plurality of partition walls of each said double-walled structure defines said fluid passage as a tortuous fluid passage.

6. The tank assembly of claim 1, wherein said fluid passages of said double-walled structures are interconnected so as to define two separate fluid passes.

7. The tank assembly of claim 1, wherein said fluid passages of said double-walled structures are interconnected so as to define at least three separate fluid passes.

* * * * *